May 30, 1939. S. B. BLAISDELL ET AL 2,160,715
MACHINE FOR MAKING BRAIDED WIRE NETTING
Filed June 19, 1936 3 Sheets-Sheet 1

Inventors:-
Sidney B. Blaisdell
Robert J. A. Ingouf
by their Attorneys
Howson & Howson Inventors:-
Sidney B. Blaisdell
Robert J. A. Ingouf
by their Attorneys
Howson & Howson May 30, 1939. S. B. BLAISDELL ET AL 2,160,715
MACHINE FOR MAKING BRAIDED WIRE NETTING
Filed June 19, 1936 3 Sheets-Sheet 3

Inventors:—
Sidney B. Blaisdell
Robert J. A. Ingouf
by their Attorneys
Howson & Howson Patented May 30, 1939

2,160,715

UNITED STATES PATENT OFFICE 2,160,715

MACHINE FOR MAKING BRAIDED WIRE NETTING

Sidney B. Blaisdell, Wyncote, Pa., and Robert J. A. Ingouf, Kingsport, Tenn., assignors to Fidelity Machine Company, Wilmington, Del., a corporation of Delaware Application June 19, 1936, Serial No. 86,184

25 Claims. (Cl. 140—7)

This invention relates to a machine for making wire mesh screen and particularly a kind adapted for use in the manufacture of wire glass, i. e., sheet glass having wide mesh wire fabric imbedded therein intermediate the opposite faces thereof and lying substantially parallel to and substantially equidistant from each of the opposite faces of the glass sheet, such as is commonly used in garage doors, factory windows, skylights, etc.

Usually the wire fabric employed in sheet glass of the type noted is of the form commonly known as poultry wire wherein a series of laterally spaced wires extend in a general direction longitudinally of the sheet and at spaced intervals throughout the length thereof adjacent pairs of wires are drawn together and twisted about each other to secure the wires in place to produce the open mesh of the screen.

One objection to the construction above noted is that, when the hot molten glass is being applied to the opposite faces of the wire mesh fabric, the twisted portions of the wires entrain and hold a body of air, which when the glass cools, appears as bubbles in the center of the glass around and adjacent the wire twistings.

The object of the present invention is to make it possible and practical to produce wire glass which will be devoid of bubbles and this object is attained by providing, and one object of the present invention is to produce, an open mesh wire fabric wherein the wires extend diagonally across the fabric from side to side thereof, and wherein in place of the wires being twisted about each other, the wires will intersect and pass over and under each other at predetermined relatively spaced crossings respectively; and wherein, in order to prevent displacement of the wires at the crossings during the application of the molten glass, the wires are welded, sweated, fused or otherwise and preferably permanently and integrally attached one to the other at each or any desired number of the crossings.

Another object of the invention is to provide a simple mechanism for fabricating the screen and wherein the principles of braiding are employed to interweave the diagonally extending wires one with another and with longitudinally extending selvage wires at the opposite longitudinal edges respectively of the fabric.

Another object of the invention is to provide a simple and efficient spreading means for the fabric whereby the braiding wires are held in spaced relation to each other at what would normally be the braiding point of an ordinary braiding machine in which the braiding filaments are pulled tightly together and produce a closely compacted fabric.

Other features of the invention wil be apparent from the following description and the accompanying drawings, of which:

Fig. 4 is a fragmentary perspective view of one side of the draw-off and spreading mechanism.

Obviously, the wire screen may be of any desired width and the wires may be spaced apart to any desired extent depending upon the use to which the screen is to be put. In the present instance, the screen, as noted above, is intended for use in what is commonly termed "wire-glass" and for that purpose the wires are usually spaced approximately three-quarters of an inch apart.

Figure 5:
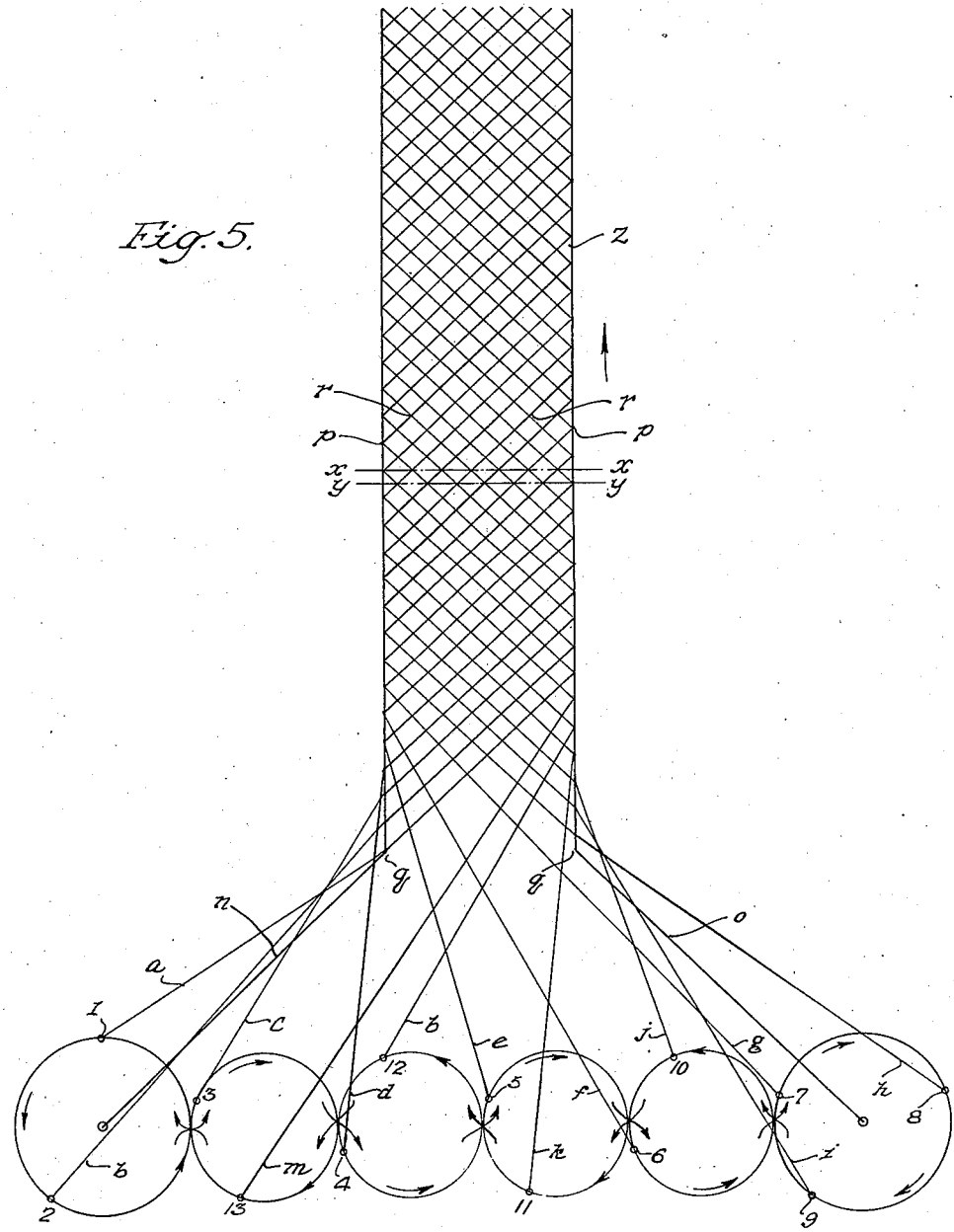
Fig. 5 is a diagrammatic view illustrating the interweaving or interbraiding of the diagonal and selvage wires.

In the present instance, as a matter of illustration, there are thirteen diagonal wires, designated a to m respectively (see Fig. 5) and two selvage wire n and o respectively.

Figures 2, 3:
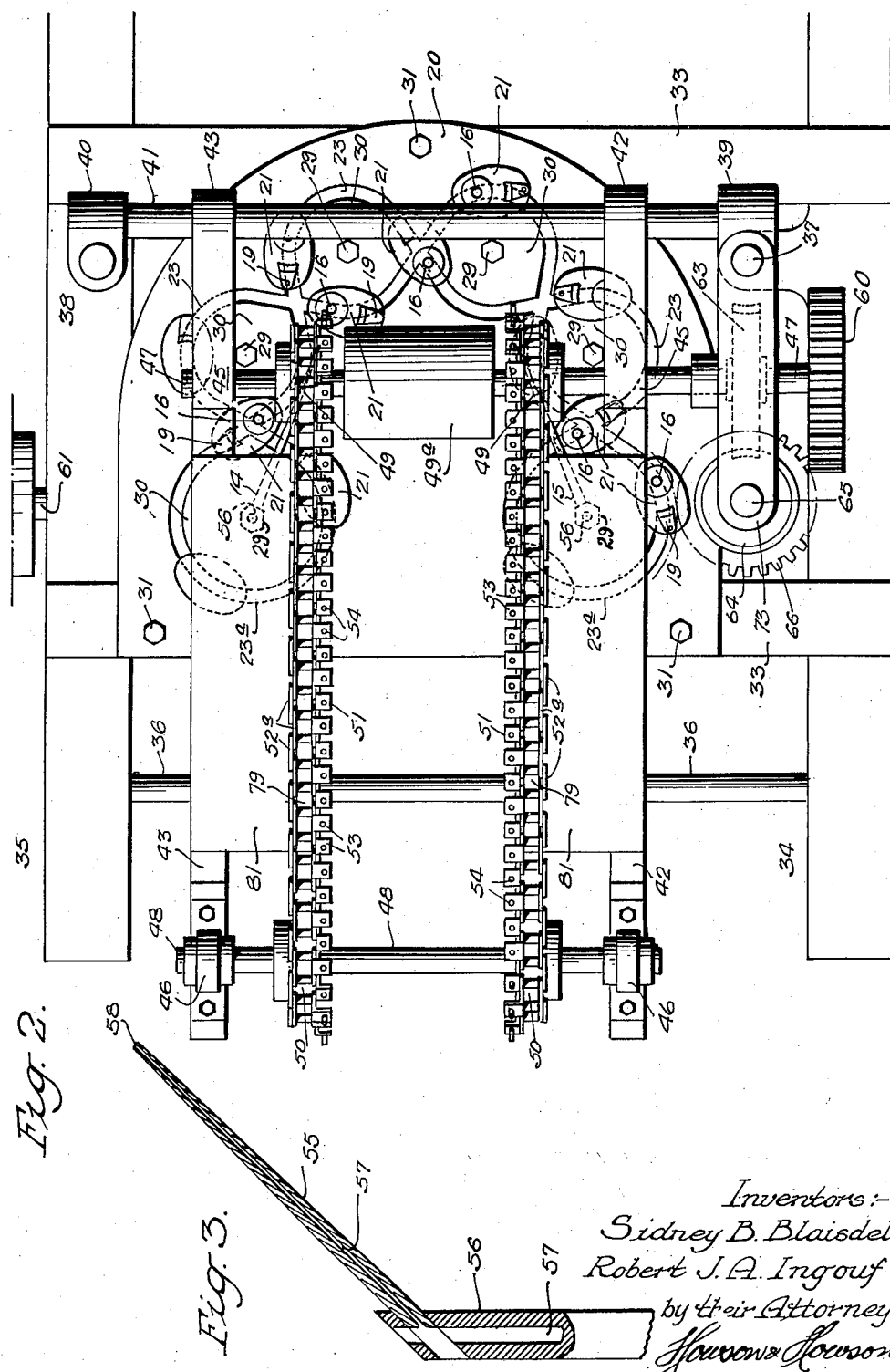
Fig. 2 is a plan view.
Fig. 3 is a vertical section of one of the selvage wire feed tubes.

The diagonal wires are arranged in the present case to be guided and interbraided with each other and with the selvage wires by thread guides or carriers 1 to 13 respectively while the selvage wires are fed into the braiding field by hollow needles or tubes 14 and 15 respectively (see Figs. 2 and 3).

The carriers 1 to 13 are each of a general construction commonly used in braiding machines, each being provided with a post 16 adapted to support a spool or package of wire. The wire is fed from the package to and out of a guide 17 at the upper end 18 of the wire guide post 19 of the carrier.

Each carrier is also provided with tensioning means and trip means for cooperation with means for stopping the machine when the wire of any carrier becomes subnormally tensioned or exhausted. Such mechanisms are common in braiding machines and for the purpose of simplicity are not shown in the present case.

The wire guides or carriers are supported on and arranged for movement over the upper face of a braiding platform 20, the base 21 of each guide, which slides on the upper surface of the platform, being provided with the usual depending guide fin 22 which passes into and through a serpentine guide slot 23 formed in and through the platform 20.

On the lower end of the guide fin 22, and bearing against the underside of the platform 20, is a keeper plate 24 from which depends a driving lug 25 arranged to be engaged by horns 26 which are carried by horn gears 27.

The horn gears 27 are rotatably mounted between the underside of the platform 20 and the upper side of a base plate 28, said horn gears having bearing on vertical spacer posts 29 located at the centers of the curved portions of the intertwining serpentine path 23 and supporting the center plates or quoits 30 which constitute parts of the platform 20.

Additional spacer posts 31 are arranged at points outside the serpentine slot 23 for supporting the major portion of the platform 20 in predetermined relation to the base plate 28.

The base plate 28 is rigidly mounted on transversely extending beams 33 which in turn have their opposite ends welded or otherwise secured to side frames 34 and 35, said beams 33 and a transverse bar 36 functioning to maintain the side frames in laterally spaced relation to each other.

Mounted on and extending vertically from the side frames 34 and 35 is a pair of vertical standards 37 and 38 and secured to said standards, above the platform 20, is a pair of brackets 39 and 40 which support a horizontal transverse shaft or bar 41.

Pivotally mounted on the bar 41 is a pair of laterally spaced arms 42 and 43 which extend substantially horizontal. The outer ends of said arms are supported from the cross rod 36 by means of vertical rods 44.

Rotatably mounted in relatively adjustable bearings 45 and 46 carried by each of the arms 42 and 43 is a pair of substantially parallel transversely extending horizontally disposed shafts 47 and 48.

On the shafts 47 and 48 are pairs of laterally spaced sprockets 49, 49 and 50, 50 respectively and passing around each pair of sprockets 49—50 is a chain 51, each inside link 52 of which is provided with a laterally extending lug 53 in which is mounted a vertically extending pin 54.

As shown in Fig. 4, the selvage wires n and o lie on the upper surface of the lateral extensions 53 of the chain links 52, outside the vertically extending pins 54, and each diagonal cross wire, where it passes around the selvage wire n or o as the case may be, also passes around the outside of one of the pins 54, and in this way the selvage wires n and o are held in laterally spaced or spread relation to each other and the diagonal cross wires are also held tautly during and after being interbraided one with the other and with the selvage wires.

The selvage wires are fed to the take-off chains 51 by means of hollow tubes or needles 55, illustrated in detail in Fig. 3, said feed tubes being mounted in hollow vertical posts 56 which are axially aligned with and secured to the upper ends of the spacer posts 29 about which the horn gears at the opposite ends respectively of the guide slot 23 revolve, said spacer posts 29 in turn being hollow and providing for the feeding of the selvage wires n and o upwardly from beneath the base plate 28 into and through the bore 57 of the tube-supporting post 56, from which the wire passes into and through the bore 57 of the laterally and upwardly projecting tube 55.

Figure 1:
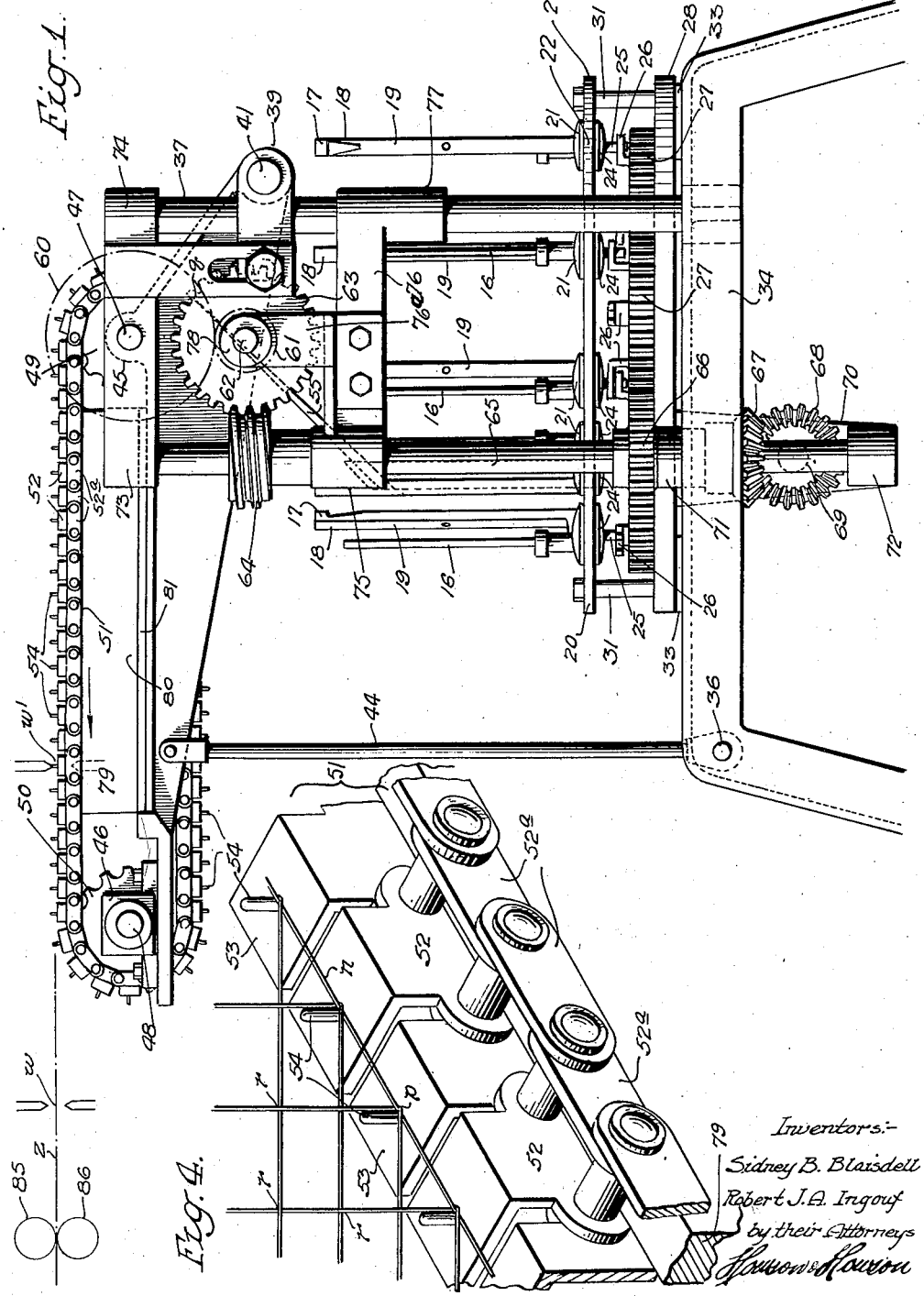
Fig. 1 is a side elevation of the machine.

The tip 58 of each of the tubes 55 is disposed adjacent the outer surfaces of the lateral projections 53 as the chains 51 pass around the sprockets 49 on the shaft 47, as clearly shown in Figs. 1 and 2, whereby the selvage wires n and o are laid on the link extensions 53 outside the pins 54.

As the horn gears 27 are rotated, the wire guides 1 to 13 respectively are caused to traverse the serpentine course 23, the wire guide 17 of each carrier causing the wire controlled thereby to be interbraided with the wires passing from the guides 17 of the other carriers, whereby, as each carrier moves around the return curve 23a at each end of the serpentine path 23, the wire is caused to pass around one of the tubes 55 of the selvage feeding means 14 and 15 respectively. In so doing the diagonal wires are laid around the pins 54 successively and also around the selvage wires n and o, as illustrated at p in Fig. 4, the relation and relative movements of the various wires during the movements of the carriers over the upper face of the platform 20 being diagrammatically illustrated in Fig. 5.

During the interbraiding movements of the carriers 1 to 13, the take-off chains 51, 51 carry the interbraided fabric z first upwardly from the points q—q where the selvage wires and cross wires are delivered to and caught by the pins 54, 54, then horizontally as illustrated in Fig. 1, said pins holding each cross wire in predetermined relation to the other cross wires and keeping the selvage wires n and o spread apart so that the tension of the diagonal cross wires a to m during interbraiding thereof will not cause the fabric to collapse and pull together closely on a line passing through the points q—q.

In order to move the chains 51, 51 at a predetermined rate of speed and in timed relation to the braiding operations of the carriers 1 to 13, the shaft 47 is provided with a gear 60 which meshes with and is driven by a pinion 61 carried by a short transversely extending shaft 62.

Secured to the shaft 62 is a worm wheel 63. The worm wheel 63 intermeshes with and is driven by a worm 64 which is secured to the upper end of a vertical shaft 65. Secured to the shaft 65 in a plane intermediate the plate 28 and platform 20 is a gear 66 which meshes with one of the horn gears 27, it being noted that the train composed with the plurality of horn-gears 27 intermesh one with another and rotation of one results in rotation of the entire series in predetermined relation to each other.

The shaft 65 which drives both the horn-gears and the take-off chains as above noted may be driven in any desired manner and in the present instance is provided with a beveled gear 67 which meshes with a similar gear 68 mounted on a horizontally extending drive shaft 69, said drive shaft 69 being provided with suitable tight and loose pulleys or any other suitable clutch mechanism by which the rotation of the shaft 69 may be stopped manually when desired or automatically by the stop motion of the machine (not shown) when the wire of any carrier becomes unduly slack or exhausted.

The drive shaft 69 in the present instance is rotatably mounted in suitable bearings carried by brackets 70 which in turn are carried by the base plate 28 or the side frames 34 and 35. The lower end of the vertical shaft 65 is rotatably mounted in bearings 71 and 72 in the present instance carried by one of the brackets 70. The upper end of the shaft 65 is rotatably mounted in a bearing 73 which is formed on one end of an arm 74 mounted on and projecting laterally from the upper end of the standard 37, said arm also providing a bearing for the shaft 47.

Intermediate the bearings 71 and 73, the shaft 65 is rotatably mounted in a third bearing 75 which is disposed immediately below and vertically supports the worm 64. The bearing 75 is carried by a laterally extending arm 76 which in turn is provided with a hub or bearing 77 mounted on the vertical standard 37. The arm 76 is provided with a pair of laterally spaced vertically extending arms 76a on the upper ends of which are bearings 78 for the short shaft 62.

In order to prevent sagging of the upper runs of the chains 51, 51 between the sprockets 49 and 50 and in order to prevent flexing of the chains laterally in the plane of the upper runs thereof, said upper runs are arranged to rest and ride on tracks or rails provided by the upper edges of vertically extending flanges 79 of angle bars 80 having horizontal flanges 81 resting on the upper sides of and secured to the arms 42, 42. The upper edges of the vertical flanges 79 which constitute the tracks lie between the inner links 52 of the chain 51 and the outer link 52a of said chains, as shown in Fig. 4.

In order to secure the cross wires together at all or any desired number of the crossing points r and to the selvage wires n and o at the turning points p if desired and when the selvage wires are employed the fabricated screen is adapted to be subjected to any desired processing, or to the operation of any suitable mechanism, by which integral attachment of the various wires to each other may be produced at the points noted. For example, either at some place along the upper run of the chains 51 intermediate the sprockets 49 and 50 or at a point or points after the fabricated screen passes off the upper runs of the chains 51, beyond the sprockets 50, the completed fabric z may pass between relatively spaced electrodes of a flash or other welding apparatus diagrammatically illustrated at w in Fig. 1, the detail structure of which per se forms no part of the present invention, it being sufficient to state that one or the other or both of the electrodes, or whatever means may be provided to effect fusing of the wires together, may be in the form of rolls or plungers arranged to move vertically into and out of contact with the fabric z along lines x—x and y—y, Fig. 5, where the crossing points p and r are arranged in alignment or to have rolling contact with the fabric, or both, as these lines are brought into registry with the fusing elements, by longitudinal movement of the chains. Any suitable means may be provided such, for example, as a pair of power driven grip rolls 85 and 86 for maintaining the fabric z in a taut condition beyond the sprockets 50 during the fusing operation.

Obviously, if the fusing operation takes place along the upper run of the chains 51, 51 between the sprockets 49 and 50, said chains will provide the necessary means for maintaining the fabric z in taut condition during the fusing operation. Under these circumstances, i. e., when and if the fusing operation takes place intermediate the sprockets 49 and 50, in order to insure that the pins 54 and link projections 53 will not fuse with the selvage and cross wires of the fabric at the points p while said wires are being fused or otherwise secured together, it is preferred to effect the welding of the wires at the points p after the fabric has passed off the chains 51, 51, for example, at the position of the welding apparatus illustrated at w in Fig. 1, while the welding of the cross wires at the points r, r along the lines x—x and y—y will take place and be effected by a separate welding apparatus illustrated at w¹ which would be located between the sprockets 49 and 50.

The semicircular arrangement of the serpentine slot 23, around a point on a line extending longitudinally of and midway between the chains 51, 51 and at which said line intersects the axis of the sprocket shaft 47 as viewed in Fig. 2, keeps all parts of the slot 23 at substantially the same distance from said point so that the carriers or guides 17 will not be required to take up an excess amount of slack wire in traversing various parts of the guide channel 23. Thus the carriers may be made shorter than would be necessary if the guide channel was laid in a general straight line as diagrammatically disclosed in Fig. 5.

In order to facilitate the interbraiding of the wires as the fabric in the course of fabrication moves upwardly and around the sprockets 49, 49 a plain faced roll or cylinder 49a is mounted on the shaft 47 intermediate the sprockets 49, 49. This roll may be secured to said shaft or revolve freely thereon as desired as it merely forms a curved surface over which the wires slide during interbraiding thereof and as the anchor points p of the wires are moved around the axis of the shaft 47 by the pins 54 on the chains 51.

Instead of the roll 49a being of the plain or smooth faced type as noted above the face of said roll may be provided with diagonal grooves or a series of pins to catch and hold the diagonal wires in predetermined relation one to another as the fabric is formed and passed around the axis of the shaft 47 by the chains 51, 51.

If desired the fabric may be made without the selvage wires n, o and the diagonal wires may cross each other without being integrally united one to another at the crossings when desired.

As shown in Figs. 1 and 4, the wire-supporting surfaces 53 of the chains 51 are above the pitch lines of said chains which as the chains pass around the sprockets 49, 49 spreads the pins 54 a slightly greater distance apart longitudinally of the chains than the pins are spaced along the upper flat wire-supporting runs of the chains, which provides a slight slackening of the wires as the screen moves up onto the flat runs of the chains. This slackness in the wires is taken up by the tensioning mechanism of the carriers in the same manner as slack is taken up in any ordinary braiding machine and which draws the wires taut in the fabricated screen on the upper runs of the chains in the present instance. If desired, the wire-supporting surfaces 53 of the chains may be lowered so that the wires lying on said surfaces will lie substantially coincident with the pitch lines of the chains and wherein no slackening of the wires will take place.

We claim:

1. A wire mesh fabric making apparatus comprising a plurality of continuous body wire supplies means for drawing from said supplies and interlacing a plurality of said continuous wires with said wires disposed in laterally spaced intersecting relation one to another and passing over and under each other to and from the opposite faces of the fabric at predetermined intersections respectively, and means for integrally uniting said wires at predetermined intersections, 2. A wire mesh fabric making apparatus comprising a plurality of continuous body wire supplies means for laying a pair of selvage wires in laterally spaced relation to each other, means for drawing from said supplies and interlacing a plurality of said continuous body wires with and in laterally spaced intersecting relation to each other and with and in angular relation to said selvage wires, and means for integrally uniting said body wires at predetermined intersections thereof.

3. A wire mesh fabric making apparatus comprising a plurality of continuous body wire supplies means for laying a pair of longitudinally extending selvage wires in laterally spaced substantially parallel relation to each other, means for drawing from said supplies and interlacing a plurality of said continuous body wires between and around said selvage wires in laterally spaced intersecting relation to each other and in angular intersecting relation to said selvage wires, and means for integrally uniting said wires at said intersections.

4. A wire mesh fabric making apparatus comprising a plurality of continuous wire body supplies means for laying a pair of longitudinally extending selvage wires in laterally spaced substantially parallel relation to each other, means for drawing from said supplies and interlacing a plurality of said continuous body wires between and around said selvage wires in laterally spaced intersecting relation to each other and in angular intersecting relation to said selvage wires, means for maintaining said selvage and said body wires in said relation to each other, and means for integrally uniting said wires at predetermined intersections.

5. A wire mesh fabric making apparatus comprising a plurality of continuous wire body supplies means for laying a pair of longitudinally extending selvage wires in laterally spaced substantially parallel relation to each other, means for drawing from said supplies and interlacing a plurality of said continuous body wires between and around said selvage wires in laterally spaced intersecting relation to each other and in angular intersecting relation to said selvage wires, means for maintaining said selvage and said body wires in said relation to each other, means for advancing said maintaining means in predetermined relation to the laying and interlacing of said body and selvage wires thereon and therebetween, and means for integrally uniting said wires at predetermined intersections.

6. A wire mesh fabric making apparatus comprising a plurality of continuous body wire supplies means for laying a pair of longitudinally extending selvage wires in laterally spaced substantially parallel relation to each other, means for drawing from said supplies and interlacing a plurality of said continuous body wires between and around said selvage wires in laterally spaced intersecting relation to each other and in angular intersecting relation to said selvage wires, means for integrally uniting said wires at predetermined intersections, and means for applying longitudinal and lateral tension to said fabric during said laying and interlacing of said wires and during said uniting thereof to maintain said wires in said relation to each other.

7. In a wire mesh fabric making apparatus, the combination of a plurality of continuous body wire supplies, means for drawing from said supplies and interbraiding a plurality of said continuous wires, and means cooperating with said braiding means for maintaining said wires in laterally spaced relation to each other during said interbraiding.

8. In a wire mesh fabric making apparatus, the combination of a plurality of continuous body wire supplies, means for drawing from said supplies and interbraiding a plurality of said continuous wires, and take-off means including means cooperating with said braiding means for maintaining said wires in laterally spaced relation to each other during and subsequent to said interbraiding.

9. In a wire mesh fabric making apparatus, the combination of a plurality of continuous body wire supplies means for drawing from said supplies and interbraiding a plurality of said continuous wires, take-off means including means cooperating with said braiding means for maintaining said wires in laterally spaced relation to each other during and subsequent to said interbraiding, and means for advancing said maintaining means in synchronization with said interbraiding.

10. In a wire mesh fabric making apparatus, the combination of a plurality of continuous body wire supplies, means for drawing from said supplies and interbraiding a plurality of said continuous wires, means for feeding a pair of selvage wires in laterally spaced relation to each other into the field of said interbraiding for incorporation with said plurality of wires in said fabric, and means cooperating with said braiding means for maintaining said plurality of wires in laterally spaced relation to each other along and between said selvage wires during said interbraiding.

11. In a wire mesh fabric making apparatus, the combination of a plurality of continuous body wire supplies, means for drawing from said supplies and interbraiding a plurality of said continuous wires, means for feeding a pair of selvage wires in laterally spaced relation to each other into the field of said interbraiding for incorporation with said plurality of wires in said fabric, take-off means including means cooperating with said braiding means for maintaining said plurality of wires in laterally spaced relation to each other along and between said selvage wires during and subsequent to said interbraiding, and means for advancing said maintaining means in synchronization with said interbraiding.

12. In a wire mesh fabric making apparatus, the combination of a braiding platform provided with an intertwining serpentine guide channel having return bends at the opposite ends respectively thereof, a plurality of wire guides mounted on said platform and arranged to traverse a course defined by said channel in predetermined relation to each other for effecting interbraiding of said wires, and means arranged in spaced relation to said platform for positioning and maintaining said wires in laterally spaced relation to each other during said interbraiding thereof.

13. In a wire mesh fabric making apparatus, the combination of a braiding platform provided with an intertwining serpentine guide channel having return bends at the opposite ends respectively thereof, a plurality of wire guides mounted on said platform and arranged to traverse a course defined by said channel in predetermined relation to each other for effecting interbraiding of said wires, take-off means arranged in spaced relation to said platform for positioning and maintaining said wires in laterally spaced relation to each other during and subsequent to said interbraiding thereof, and means for actuating said take-off means in predetermined relation to the movements of said wire guides over said platform for carrying the interbraided fabric away from the place where said interbraiding is effected.

14. In a wire mesh fabric making apparatus, the combination of a braiding platform provided with an intertwining serpentine guide channel having return bends at the opposite ends respectively thereof, a plurality of wire guides mounted on said platform and arranged to traverse a course defined by said channel in predetermined relation to each other for effecting interbraiding of said wires, means arranged in spaced relation to said platform for positioning and maintaining said wires in laterally spaced relation to each other during said interbraiding thereof, and means disposed within said channel return bends for feeding a pair of selvage wires in laterally spaced relation to each other to said wire spacing means for incorporation with the opposite edges respectively of the fabric during said interbraiding of said wires.

15. In a wire mesh fabric making apparatus, the combination of a braiding platform provided with an intertwining serpentine guide channel having return bends at the opposite ends respectively thereof, a plurality of wire guides mounted on said platform and arranged to traverse a course defined by said channel in predetermined relation to each other for effecting interbraiding of said wires, take-off means arranged in spaced relation to said platform for positioning and maintaining said wires in laterally spaced relation to each other during and subsequent to said interbraiding thereof, means for actuating said take-off means in predetermined relation to the movements of said wire guides over said platform for carrying the interbraided fabric away from the place where said interbraiding is effected, and means disposed within said channel return bends for feeding a pair of selvage wires in laterally spaced relation to each other to said wire spacing means for incorporation with the opposite edges respectively of the fabric during said interbraiding of said wires.

16. In a wire mesh fabric making apparatus, the combination of a platform provided with an intertwining serpentine track, a take-off mechanism spaced above said platform and including a pair of laterally spaced substantially parallel members, a series of wire holders on and arranged in spaced relation along each of said members, and a series of wire guides operable on said platform and guided by said track for interbraiding a plurality of wires respectively controlled by said guides and for laying said wires around said holders respectively.

17. In a wire mesh fabric making apparatus, the combination of a platform provided with an intertwining serpentine track having return bends at its opposite ends, a take-off mechanism spaced above said platform and including a pair of laterally spaced substantially parallel members, a series of wire holders on and arranged in spaced relation along each of said members, a pair of selvage wire guides located within said return bends respectively and extending to points adjacent the holding elements on said members respectively, and a series of wire guides operable on said platform and guided by said track for interbraiding a plurality of body wires respectively controlled by said guides and for laying said body wires around said holders and selvage wires respectively.

18. In a wire mesh fabric making apparatus, the combination of a platform provided with an intertwining serpentine track comprising a plurality of substantially circular portions connected by intermediate crossings and a pair of substantially circular return bends at the opposite ends respectively of said track, a take-off mechanism spaced above said platform and including a pair of laterally spaced substantially parallel members, a series of wire holders on and arranged in spaced relation along each of said members, a pair of selvage wire guides located at the centers of said return bends and extending to points adjacent the wire holders on said members respectively, a series of wire guides operable on said platform and guided by said track for interbraiding a plurality of body wires respectively controlled by said guides and for laying said body wires around said holders and selvage wires respectively, and a plurality of driving elements for said body wire guides arranged to revolve about the axis of said circular portions and return bends respectively of said track.

19. In a wire mesh fabric making apparatus, the combination of a platform provided with an intertwining serpentine track comprising a plurality of substantially circular portions connected by intermediate crossings and a pair of substantially circular return bends at the opposite ends respectively of said track, a take-off mechanism spaced above said platform and including a pair of laterally spaced substantially parallel members, a series of wire holders on and arranged in spaced relation along each of said members, a pair of selvage wire guides located at the centers of said return bends and extending to points adjacent the wire holders on said members respectively, a series of wire guides operable on said platform and guided by said track for interbraiding a plurality of body wires respectively controlled by said guides and for laying said body wires around said holders and selvage wires respectively, a plurality of driving elements for said body wire guides arranged to revolve about the axis of said circular portions and return bends respectively of said track, driving elements for said parallel members for moving said members longitudinally to draw the fabric from the place of interbraiding of said wires, and means for actuating and synchronizing the operations of said driving elements.

20. The method of producing wire mesh fabric which consists in laying a plurality of continuous wires in laterally spaced relation to each other in a diagonal direction relative to the side edges of the fabric, drawing from continuous supplies and laying a second plurality of continuous wires in laterally spaced relation to each other in an opposite direction diagonally of the fabric across the first series, interlacing the wires of said series one with the other, and fusing the wires of both series together at the crossings.

21. The method of producing wire mesh fabric which consists in holding a pair of selvage wires in laterally spaced substantially parallel relation to each other, drawing from continuous supplies and laying two series of continuous body wires from one to the other and around each of the selvage wires in opposite diagonal directions so that the continuous body wires of one series intersect the continuous body wires of the other series in laterally spaced relation, interlacing the wires of said series one with the other, and fusing the body wires of the two series together at the intersections.

22. The method of producing wire mesh fabric which consists in holding a pair of selvage wires in laterally spaced substantially parallel relation to each other, drawing from continuous supplies and laying two series of continuous body wires from one to the other and around each of the selvage wires in opposite diagonal directions so that the continuous body wires of one series intersect the continuous body wires of the other series in laterally spaced relation, interlacing the wires of said series one with the other, and fusing the body wires of the two series together at the intersections and to the selvage wires at the points where the body wires pass around the selvage wires.

23. The method of producing wire mesh fabric which consists in drawing from continuous supplies and interbraiding a multiplicity of continuous wires together, holding the continuous wires in laterally spaced relation to each other during and subsequent to the interbraiding thereof so that the continuous wires intersect each other and lie in laterally spaced and opposite diagonal relation to each other and fusing the wires together at the intersections.

24. The method of producing wire mesh fabric which consists in holding a pair of selvage wires in laterally spaced substantially spaced relation to each other, drawing from continuous supplies and interbraiding a multiplicity of continuous body wires with each other and with the selvage wires, holding the continuous body wires in laterally spaced relation to each other so that the continuous wires cross over and under each other and pass around the selvage wire and lie in opposite diagonal intersecting relation to each other and to the selvage wires, and fusing the wires together at the intersections.

25. The method of producing wire mesh fabric which consists in laying a pair of selvage wires in laterally spaced substantially parallel relation to each other, drawing from continuous supplies and interbraiding a multiplicity of continuous body wires together and passing said body wires around said selvage wires during said interbraiding, holding the selvage wires and also the continuous body wires in laterally spaced relation to each other during the interbraiding, and moving the selvage wires longitudinally during the interbraiding of the continuous body wires so that the body wires will intersect and lie in opposite diagonal directions relative to the selvage wires.

SIDNEY B. BLAISDELL.
ROBERT J. A. INGOUF.